United States Patent
Lin

(10) Patent No.: US 10,021,986 B1
(45) Date of Patent: Jul. 17, 2018

(54) FIXING DEVICE FOR CHAIRS

(71) Applicant: SPEC SEATS TECHNOLOGIES INC., Chung-Li, Taoyuan Hsien (TW)

(72) Inventor: Mei Chuen Lin, Chung-Li (TW)

(73) Assignee: SPEC SEATS TECHNOLOGIES INC., Chung-Li (TW)

( * ) Notice: Subject to any disclaimer, the term of this patent is extended or adjusted under 35 U.S.C. 154(b) by 0 days.

(21) Appl. No.: 15/606,315

(22) Filed: May 26, 2017

(51) Int. Cl.
| | |
|---|---|
| A47C 15/00 | (2006.01) |
| A47C 7/58 | (2006.01) |
| A47B 87/00 | (2006.01) |
| A47C 1/124 | (2006.01) |
| A47C 7/02 | (2006.01) |
| F16B 2/06 | (2006.01) |
| F16B 2/10 | (2006.01) |
| A41F 1/00 | (2006.01) |
| A47C 31/00 | (2006.01) |

(52) U.S. Cl.
CPC .............. *A47C 7/58* (2013.01); *A47B 87/007* (2013.01); *A47C 1/124* (2013.01); *A47C 7/02* (2013.01); *F16B 2/065* (2013.01); *F16B 2/10* (2013.01); *A41F 1/00* (2013.01); *A47C 31/00* (2013.01)

(58) Field of Classification Search
CPC ......... A44B 19/26; A44B 19/44; A44B 19/06; A44B 19/403; A41F 1/00; F28D 5/02; A47C 31/00; A47C 7/58; A47C 7/02; A47C 1/124; A47B 87/007; F16B 2/065; F16B 2/10; Y10T 24/2588; Y10T 24/4453; Y10T 24/3444; Y10T 403/7141
USPC ........................................................ 297/248
See application file for complete search history.

(56) References Cited

U.S. PATENT DOCUMENTS

| | | | | |
|---|---|---|---|---|
| 1,198,726 A | * | 9/1916 | Huntley ................. | A47C 1/124 297/248 |
| 1,934,396 A | * | 11/1933 | Bales ..................... | A47C 1/124 24/339 |
| 2,637,081 A | * | 5/1953 | Henrikson ............. | A47C 1/124 297/248 |
| 2,750,990 A | * | 6/1956 | Eves ...................... | A47C 1/124 24/335 |
| 2,821,762 A | * | 2/1958 | Foose .................... | A47C 1/124 24/115 G |

(Continued)

FOREIGN PATENT DOCUMENTS

| | | |
|---|---|---|
| CN | 203828459 U | 9/2014 |
| CN | 205410459 U | 8/2016 |
| TW | M328232 | 3/2008 |

*Primary Examiner* — Mark R Wendell
(74) *Attorney, Agent, or Firm* — Rabin & Berdo, P.C.

(57) ABSTRACT

A fixing device includes an encircling element having left and right lateral sides and an intermediate portion that is formed with a notch and that is bent to form two limiting apartments at two sides of the notch, each limiting apartment having left and right walls extending integrally and transversely from a longitudinal axis of the encircling element and a middle wall interconnecting the walls that define an opening accessible only from a direction that is the same direction, each of the left and right lateral sides is formed with a retainer stub; a sluice gate having two notches disposed on the retainer stubs for denying access into the apartments; and a locking member extending through a through hole in the sluice gate and the notch in the encircling element for preventing untimely disengagement of the sluice gate from the encircling element.

2 Claims, 8 Drawing Sheets

(56) References Cited

U.S. PATENT DOCUMENTS

| | | | | |
|---|---|---|---|---|
| 3,188,138 A * | 6/1965 | Lockshin | A47C 1/124 108/64 |
| 3,207,551 A * | 9/1965 | Axtell | A47B 91/06 297/248 |
| 3,227,487 A * | 1/1966 | Blanchard, Jr. | A47C 1/124 108/64 |
| 3,291,523 A * | 12/1966 | Krueger | A47C 1/124 297/239 |
| 3,314,718 A * | 4/1967 | Crandall | A47C 1/124 297/239 |
| 3,383,738 A * | 5/1968 | Fox | A47C 1/124 24/306 |
| 3,614,157 A * | 10/1971 | Hendrickson | A47C 1/124 297/248 |
| 3,669,491 A * | 6/1972 | Weslock | A47C 1/124 24/339 |
| 3,825,300 A * | 7/1974 | Lieberman | A47C 1/124 297/248 |
| 4,066,373 A * | 1/1978 | Workman | A47C 1/124 24/339 |
| 4,224,721 A * | 9/1980 | Ohlson | F16B 7/0433 24/376 |
| 5,542,159 A * | 8/1996 | Schultz | A47C 1/124 24/341 |
| D392,180 S * | 3/1998 | Bilow | D8/382 |
| 5,957,530 A * | 9/1999 | Gutgsell | A47C 1/124 297/232 |
| 7,111,902 B1 * | 9/2006 | Conner | A47C 1/124 297/248 |
| 7,607,733 B1 * | 10/2009 | Lin | A47C 1/124 297/248 |
| 9,826,832 B2 * | 11/2017 | Lin | A47B 87/007 |
| 2005/0012371 A1 * | 1/2005 | Mendenhall | A47C 1/124 297/248 |
| 2007/0210631 A1 * | 9/2007 | Berning | A47C 13/005 297/248 |
| 2009/0152919 A1 * | 6/2009 | Lin | A47C 1/124 297/248 |
| 2010/0176634 A1 * | 7/2010 | Wahl | A47C 13/005 297/248 |
| 2012/0013156 A1 * | 1/2012 | Tsai | A47C 1/124 297/248 |
| 2012/0286551 A1 * | 11/2012 | Kumazawa | A47C 1/124 297/248 |
| 2014/0152059 A1 * | 6/2014 | Swy | A47C 1/124 297/188.01 |
| 2015/0335169 A1 * | 11/2015 | Lin | A47C 31/00 24/517 |
| 2016/0095434 A1 * | 4/2016 | Lin | A47B 87/007 24/517 |

* cited by examiner

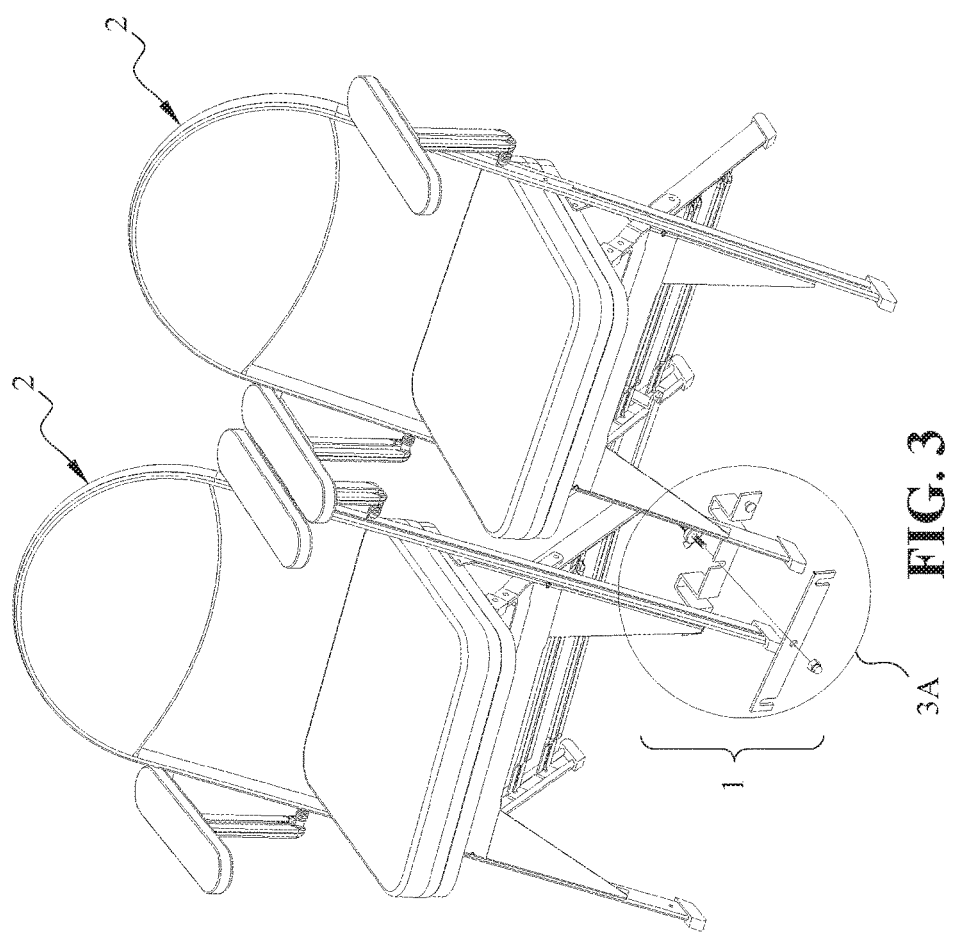

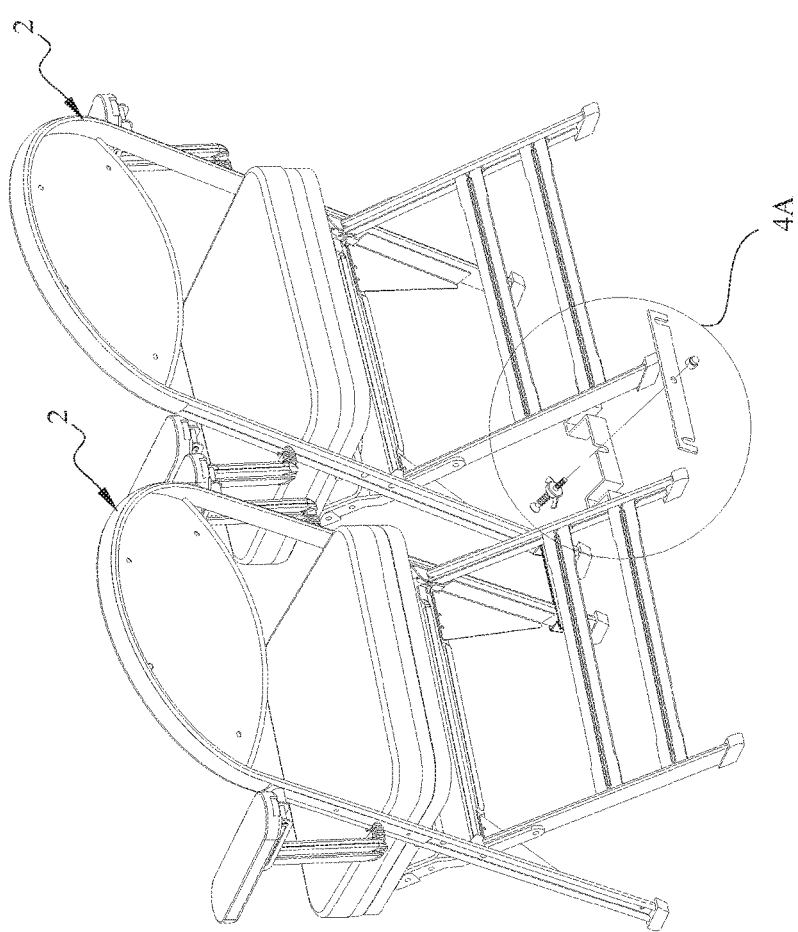

FIXING DEVICE FOR CHAIRS

BACKGROUND OF THE INVENTION

1. Field of the Invention

The present invention relates generally to a fixing device, and more particularly to a fixing device for chairs, especially for connecting and fixing an adjacent pairs of chairs or a row of chairs.

2. The Prior Arts

In an assembly hall or a baseball stadium, pluralities of foldable chairs or seats are arranged in rows in order to permit seating of audience for watching a game or match. During the chair arrangement, after unfolding each independent chair, the adjacent pairs of chairs are coupled together via a connector or fixing device such that only a relatively small space is left between the adjacent pair of chairs. Under this condition, it may cause discomfort to the seated persons if at least one of them is fat or hefty. To eliminate the above drawback, the chairs should be arranged independently and individually so as to permit appropriate gap between adjacent two chairs, however this may lead to overall unevenness of the chairs.

Taiwan Patent No. M328232 discloses a chair spacer to be utilized between two adjacent chairs to provide an expansion space between the chairs. The chair spacer includes a frame body having a first engagement post and a fastening element with an engaging hole having a narrow hole section. One foldable chair has a front leg formed with a locking plate with a hole having a narrow hole section while another foldable chair has a second engagement post. For coupling the two chairs, the first engagement post is inserted through the locking plate deep into the narrow hole section of the hole, after which the fastening element is rotated in such a manner so as to abut the other end tightly against the front leg of one chair. Then, the second engagement post of another chair is inserted through a hole in the frame body so as to abut against the narrow hole section of the hole, hence the two chairs are coupled together by the frame body and leaving an appropriate space between the chairs.

One drawback resulted from the use of the chair spacer disclosed according to the above patent M328232 resides in that some locking plates with through hole having the narrow hole section must be welded on the sides of the chairs, thereby causing inconvenient to the user, and hence resulting in high manufacturing expense.

One Chinese Patent CN 203828459U discloses a more simpler chair spacer that eliminates the abovementioned welding problem and that includes a inverted U-shaped encircle element having left and right sides, an inverted U-shaped limiting members and an elongated sluice gate having left and right notches, wherein the inverted U-shaped limiting members is disposed within the inverted U-shaped encircle element in such a manner to define first and second chambers between the left and right sides. The elongated sluice gate is connected pivotally to one side of the encircle element. The sluice gate and the inverted U-shaped limiting member cooperatively define first and second interlocked recesses such that after disposing an adjacent pair of chairs side by side, the front or the rear legs of adjacent pairs of chairs can be disposed in the left and right chambers of the encircle element and are connected together when the sluice gate is mounted on the encircle element and hence the chairs can be arranged in a straight line or in a curved line according to the requirement of the hall, where the adjacent legs are spaced apart at a preset distance.

One disadvantage of the aforesaid patent CN 203828459U resides in that after the inverted U-shaped encircle element and the inverted U-shaped limiting members are interconnected relative to each other, one side of encircle element is still required to be connected pivotally the sluice gate such that the entire assembly is somewhat complicated and hence results in high manufacture expense.

Another Chinese Patent CN 205410459U discloses a fixing device for chairs, includes an encircle element, a fixing element, and a sluice plate. The encircle element has two opposite lateral sides and is bent to form left and right flap portions located inwardly of the lateral sides and extending transversely and outwardly from the lateral sides to define left and right chambers which are accessible only from the same direction, each of the left and right lateral sides is formed with a through hole. The fixing element is installed on the encircle element at one of the through holes. The sluice plate has a first end fastened movably to the encircle element via a fastener and a second end formed with an engaging notch such that the sluice plate is movable relative to the encircle element, between a locked position, where the engaging notch at the second end of the sluice plate engages the fixing element, thereby preventing access into the chambers and an unlocked position, where the second end of the sluice plate moves away from the encircle element and disengages the engaging notch from the fixing element, thereby permitting access into the chambers.

Note that in said patent CN 205410459U, in one embodiment, two fixing elements are utilized and are installed to two through holes in the lateral sides of the encircle element while the sluice plate has two opposing engaging notches for engaging the fixing elements respectively once the sluice plate is moved to the locked position. Preferably, two fastener screws serve the purpose of the fixing elements.

SUMMARY OF THE INVENTION

A primary objective of the present invention is to provide a fixing device for chair, which is simple in structure and which does not required any additional machining conducted on the chairs so as to reduce the manufacturing expense thereof.

One distinct feature of the present invention resides in that an elongated plate is bent in such a manner to form an encircle element having left and right lateral sides and two limiting apartments between the left and right lateral sides such that after an adjacent pair of chairs are disposed side by side, front or rear legs of the chairs are encircled by the limiting apartments, after which a sluice gate is coupled to the encircle element for shielding and denying access into the limiting apartments, thereby disposing the adjacent pair of chairs in a desired arrangement.

A fixing device of the present invention for fixing two adjacent chairs, includes: an encircle element having left and right lateral sides and an intermediate portion that is located between the left and right lateral sides, that is formed with a notch and that is bent in such a manner to form left and right limiting apartments at two sides of the notch, each limiting apartment having left and right walls extending integrally and transversely from a longitudinal axis of the encircle element and a middle wall interconnecting the left and right walls to define an opening accessible only from the same direction, each of the left and right lateral sides being formed with a retainer stub extending transversely and outwardly from the longitudinal axis of the encircle element opposite to the limiting apartments; a sluice gate having left and right notches disposed on the retainer stub of the encircle element for shielding and denying access into the limiting apartments and a through hole in alignment with the notch of the encircle element; and a locking member extending through the through hole in the sluice gate and the notch of the encircle element for preventing untimely disengagement of the sluice gate from the encircle element.

Preferably, each of the retainer stub is formed with an enlarged head having a cross section greater than a cross section of each of the left and right notches of the sluice gate such that the sluice gate is disposed stationarily on the encircle element via the enlarged head. In other words, the sluice gate is prevented from untimely disengagement relative to the encircle element.

In this embodiment, the locking member includes a threaded bolt extending through the notch of the encircle element and the through hole in the sluice gate, a first nut and a second nut mounted threadedly on the threaded bolt in such a manner to sandwich the sluice gate and the encircle element tightly between the first and second nuts upon tightening of the threaded bolt.

Preferably, the threaded bolt has an enlarged head and a biasing spring sleeved around the threaded bolt and providing an axial compression force on the first nut to prevent loosening of the first nut on the threaded bolt.

After disposing more than two chairs side by side, the front or rear legs of an adjacent pair of chairs are encircled by the limiting apartments, after which the sluice gate is coupled to the encircle element for shielding and denying access into the limiting apartments, thereby disposing the adjacent pair of chairs in a desired arrangement.

Since the fixing device of the present invention is constructed according to the requirement of the applications, the preset distance between adjacent pair of legs can be varied in order to complement with the length or design of the encircle element and the sluice gate once the adjacent pair of chairs is fastened by the fixing device of the present invention.

BRIEF DESCRIPTION OF THE DRAWINGS

The present invention will be apparent to those skilled in the art by reading the following detailed description of a preferred embodiment thereof, with reference to the attached drawings, in which:

FIG. 3 shows the fixing device of the present invention, which fixes two front legs of an adjacent pair of chairs;

FIG. 4 shows the fixing device of the present invention, which fixes two rear legs of an adjacent pair of chairs;

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
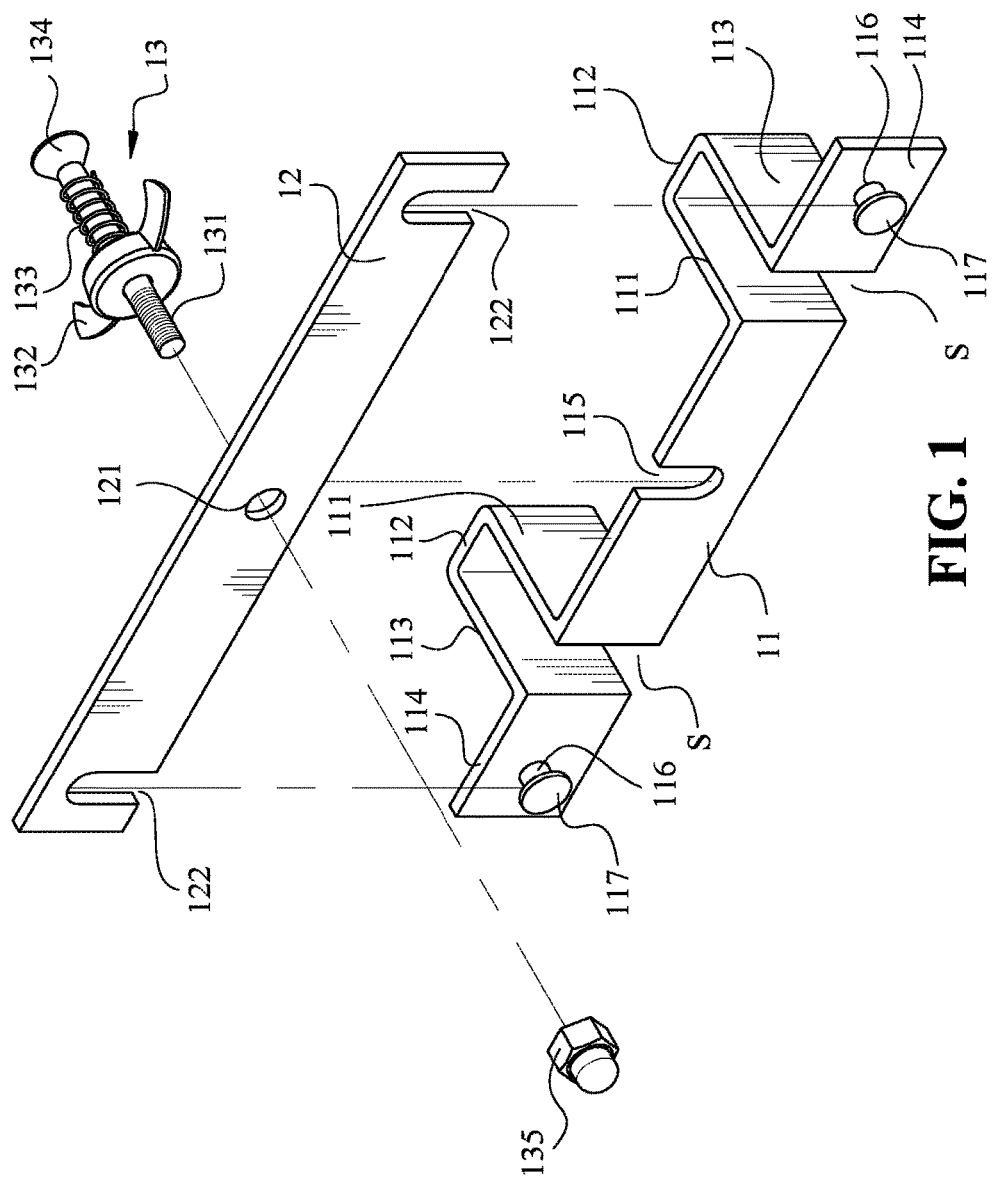
FIG. 1 is a perspective and exploded view of a chair fixing device of the present invention.
Figure 2:
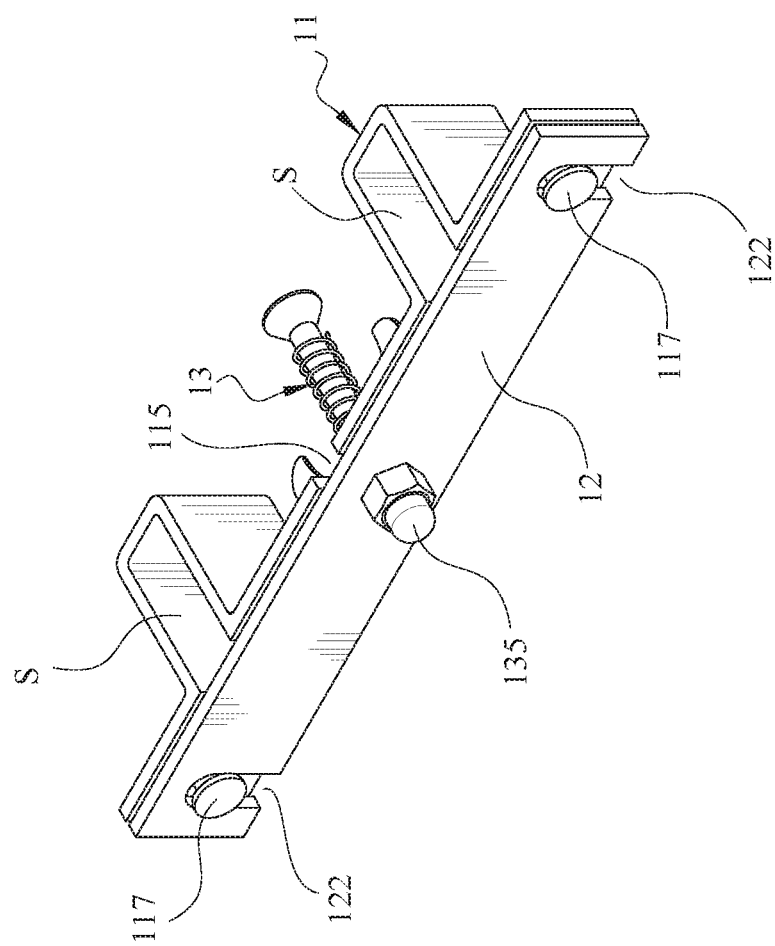
FIG. 2 is a perspective view of the chair fixing device of the present invention, wherein a sluice gate of the fixing device is shown in a locked position relative to an encircle element.

Referring to FIGS. 1 and 2, wherein FIG. 1 is a perspective and exploded view of a chair fixing device of the present invention; and FIG. 2 is a perspective view of the chair fixing device of the present invention, wherein a sluice gate of the fixing device is shown in a locked position relative to an encircle element. As shown, a chair fixing device of the present invention for fixing two adjacent chairs, includes an encircle element 11, a sluice gate 12 and a locking member 13.

The encircle element 11 is a flat metal plate with a suitable thickness, and has left and right lateral sides 114 and an intermediate portion that is located between the left and right lateral sides 114, that is formed with an upwardly opening notch 115 and that is bent in such a manner to form left and right limiting apartments at two sides of the notch 115. Each limiting apartment has left and right walls 111, 113 extending integrally and transversely from a longitudinal axis of the encircle element 11 and a middle wall 112 interconnecting the left and right walls 111, 113 to define an opening S accessible only from the same direction. Each of the left and right lateral sides 114 is formed with a retainer stub 116 extending transversely and outwardly from the longitudinal axis of the encircle element 11 opposite to the limiting apartments.

The sluice gate 12 is a flat metal plate with a suitable thickness, has left and right notches 122 such that once the sluice gate 12 is mounted on the encircle element 11, the left and right notches 122 are disposed on the retainer stub 116 of the encircle element 11 for shielding the openings S of the limiting apartments and for denying access into the limiting apartments. The sluice gate 12 further has a through hole 121 that is located between the left and right notches 122 and that is in alignment with the notch 115 of the encircle element 11 once the sluice gate 12 is mounted on the encircle element 11. In this embodiment, each of the retainer stub 116 is formed with an enlarged head 117 having a cross section greater than a cross section of each of the left and right notches 122 of the sluice gate such that the sluice gate 12 is disposed stationarily on the encircle element 11 via the enlarged head 117. In other words, the sluice gate 12 is retained stably on the retainer stubs 116 of the encircle element 11 due to presence of the enlarged heads 117.

The locking member 13 is used for locking the encircle element 11 and the sluice gate 11 together. To be more specific, the locking member 13 extends through the through hole 121 in the sluice gate 12 and the notch 115 of the encircle element 11 for preventing untimely disengagement of the sluice gate 12 from the encircle element 11.

Preferably, the locking member 13 includes a threaded bolt 131, a first nut 132 and a second nut 135. For locking the encircle element 11 and the sluice gate 11 together, the second nut 135 is disposed at one side of the sluice gate 12 while the first nut 132 is sleeved threadedly on the threaded bolt 131 first of all and the free end of the threaded bolt 131 is inserted ding through the notch 115 of the encircle element 11 and the through hole 121 in the sluice gate 12 in such a manner to sandwich the sluice gate 12 and the encircle element 11 tightly between the first and second nuts 132, 135 upon tightening of the threaded bolt 131. In this embodiment, the first nut 132 is a wing nut sleeved threadedly on the threaded bolt 131. To be more specific, the threaded bolt 131 has an enlarged head 134 and a biasing spring 133 sleeved around the threaded bolt 131 for providing an axial compression force on the first nut 132 upon tightening of the threaded bolt 131 relative to the second nut 135. In other words, the encircle element 11 and the sluice gate 12 are prevented from wobbling due to stable and firm sandwiching of the first and second nuts 131, 135 by virtue of the biasing action of the spring 133, as best shown in FIG. 2.

Figure 3A:
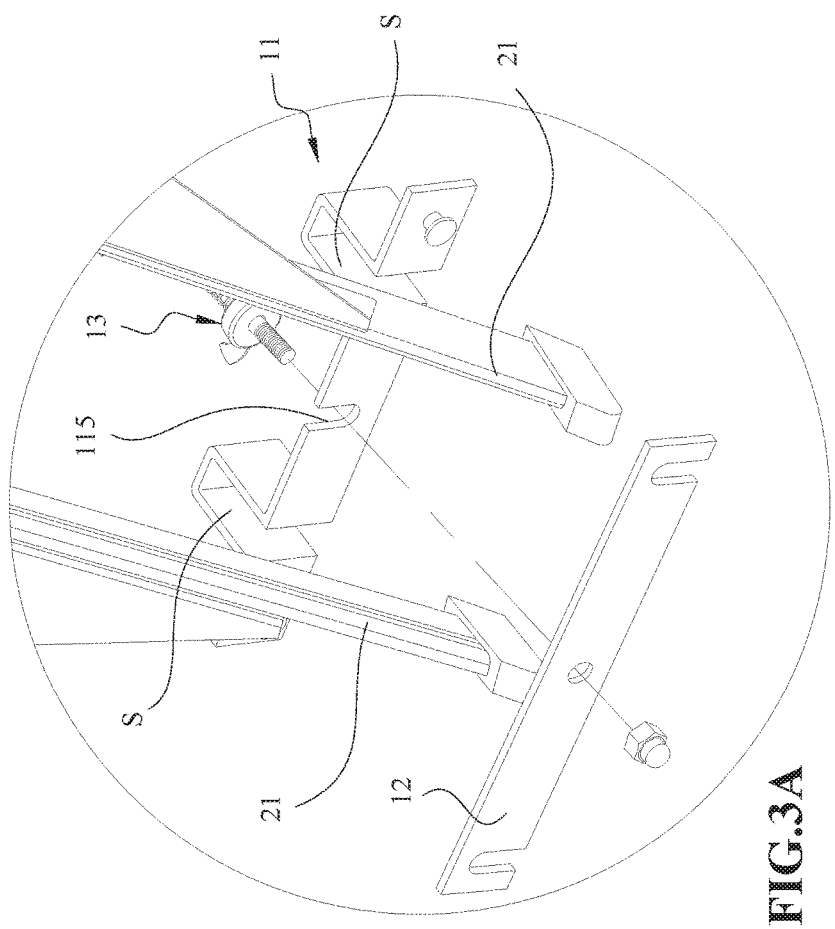
FIG. 3A is a fragmentary enlarged view of the fixing device of the present invention shown in FIG. 3.

FIG. 3 shows the fixing device 1 according to the first embodiment of the present invention, which fixes two front legs 21 of an adjacent pair of chairs 2. When it is desired to connect an adjacent pair of chairs 2, the sluice gate 12 is firstly disposed in front of the front legs 21 and the encircle element 11 is disposed behind the front legs 21, as best shown in the enlarged portion in FIG. 3A, where the left and right limiting apartments are pushed forward through the openings S to encircle around the two front legs 21 of the adjacent pair of chairs 2, and after which, the left and right notches 122 of the sluice gate 12 are disposed on the retainer stubs 116 of the encircle element 11, thereby preventing untimely disengagement of the sluice gate 12 and the encircle element 11. In order to enhance the engagement between the sluice gate 12 and the encircle element 11, the threaded bolt 131 can be inserted through the notch 115 in the encircle element 11, the through hole 121 in the sluice gate 12 for fastening the second nut 135 in such a manner that the encircle element 11 and the sluice gate 12 are prevented from wobbling due to stable and firm sandwiching of the first and second nuts 131, 135 by virtue of the biasing action of the spring 133 (see FIG. 2).

Figure 4A:
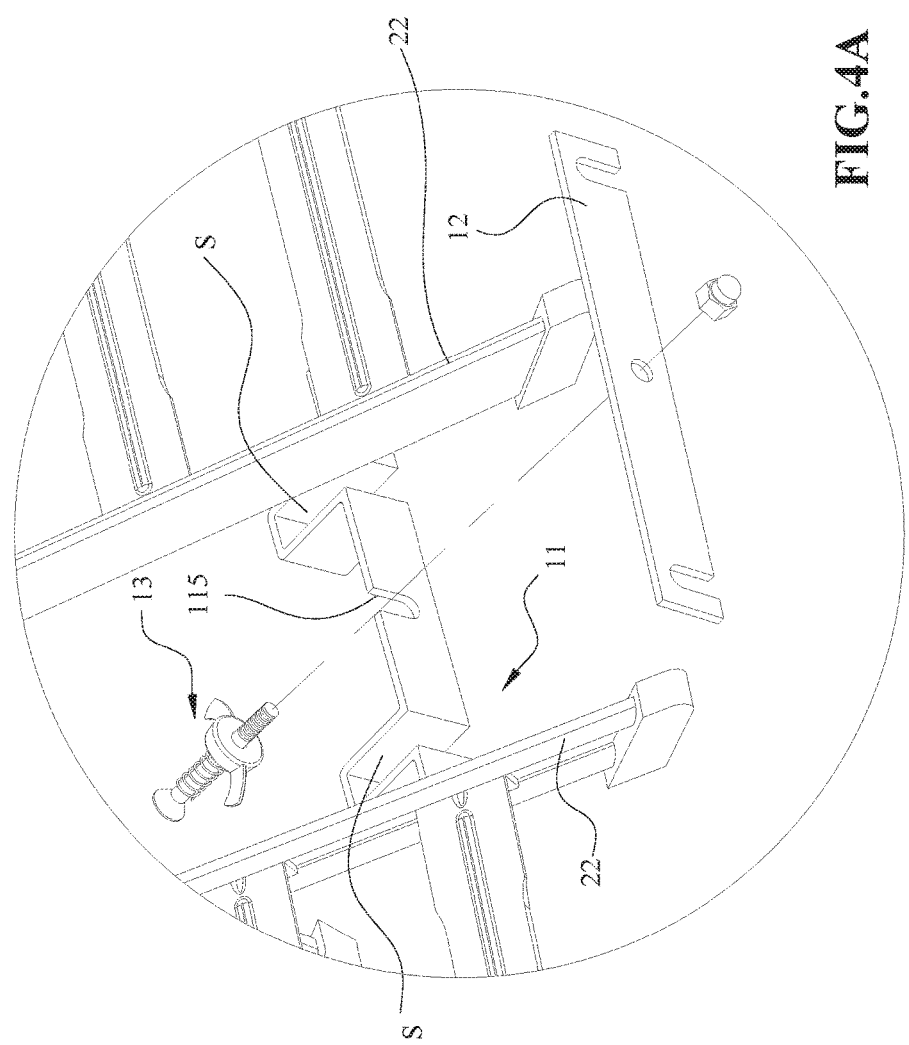
FIG. 4A is a fragmentary enlarged view of the fixing device of the present invention shown in FIG. 4.

FIG. 4 shows the fixing device 1 of the present invention, which fixes two rear legs 22 of an adjacent pair of chairs 2 while FIG. 4A is a fragmentary enlarged view of the fixing device of the present invention shown in FIG. 4. When it is desired to connect an adjacent pair of chairs 2, the sluice gate 12 is firstly disposed behind the rear legs 22 and the encircle element 11 is disposed in front of the rear legs 22, as best shown in the enlarged portion in FIG. 4A, where the left and right limiting apartments are pushed rearward through the openings S to encircle around the two rear legs 22 of the adjacent pair of chairs 2, and after which, the left and right notches 122 of the sluice gate 12 are disposed on the retainer stubs 116 of the encircle element 11, thereby preventing untimely disengagement of the sluice gate 12 and the encircle element 11. In order to enhance the engagement between the sluice gate 12 and the encircle element 11, the threaded bolt 131 can be inserted through the notch 115 in the encircle element 11, the through hole 121 in the sluice gate 12 for fastening the second nut 135 in such a manner that the encircle element 11 and the sluice gate 12 are prevented from wobbling relative to each other due to stable and firm sandwiching of the first and second nuts 131, 135 by virtue of the biasing action of the spring 133 (see FIG. 2).

Figure 5:
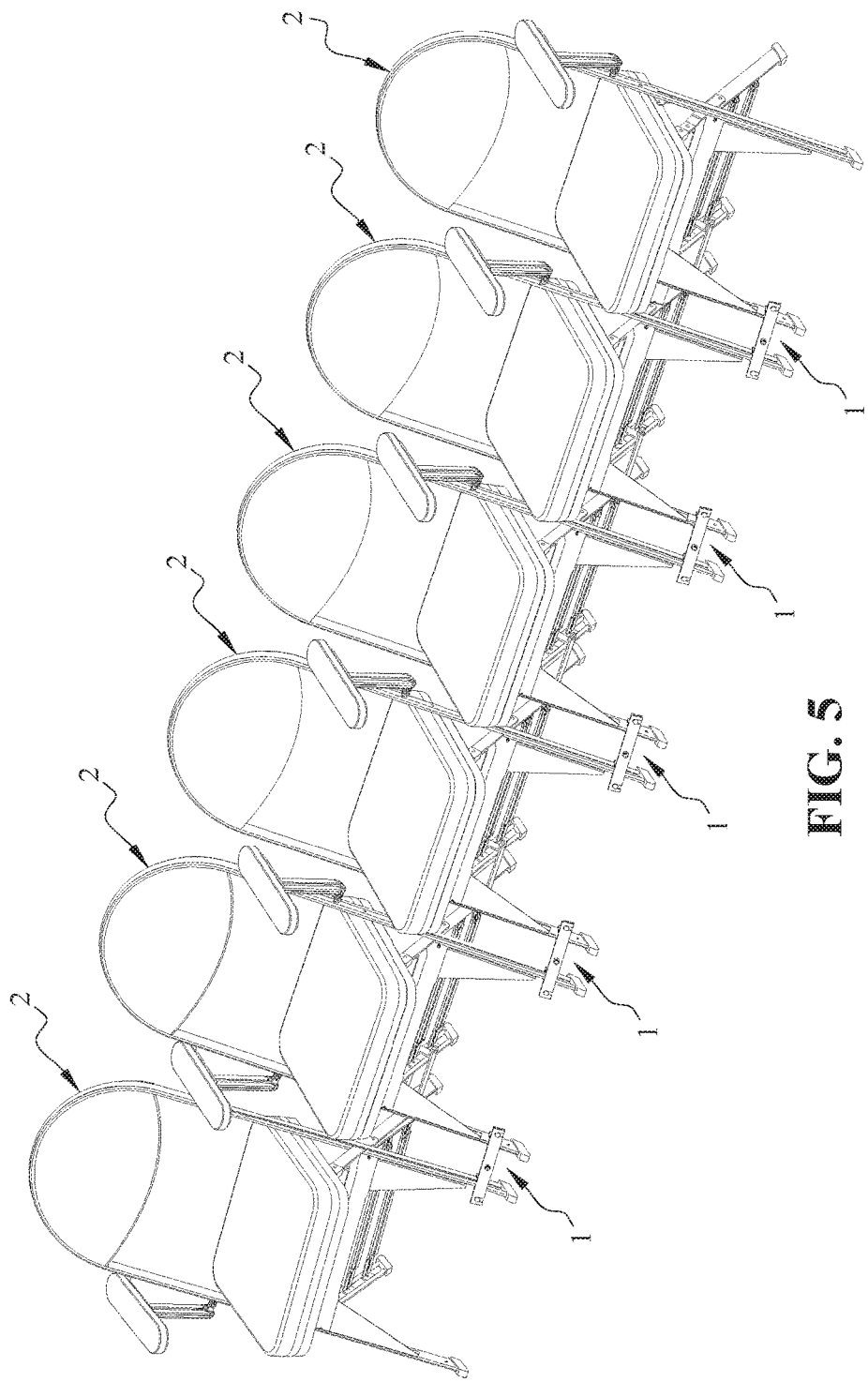
FIG. 5 shows the fixing device of the present invention, which fixes two front legs of an adjacent pair of chairs respectively such that a row of chairs extends in a straight line.

One aspect to note is that the dimension of the chair fixing device 1 of the present invention should not be limited only the above ones, the dimension thereof can be altered according the requirement of the chairs. FIG. 5 shows the fixing device of the present invention, which fixes two front and rear legs of an adjacent pair of chairs 2 respectively such that a row of chairs 2 extends in a straight line.

Figure 6:
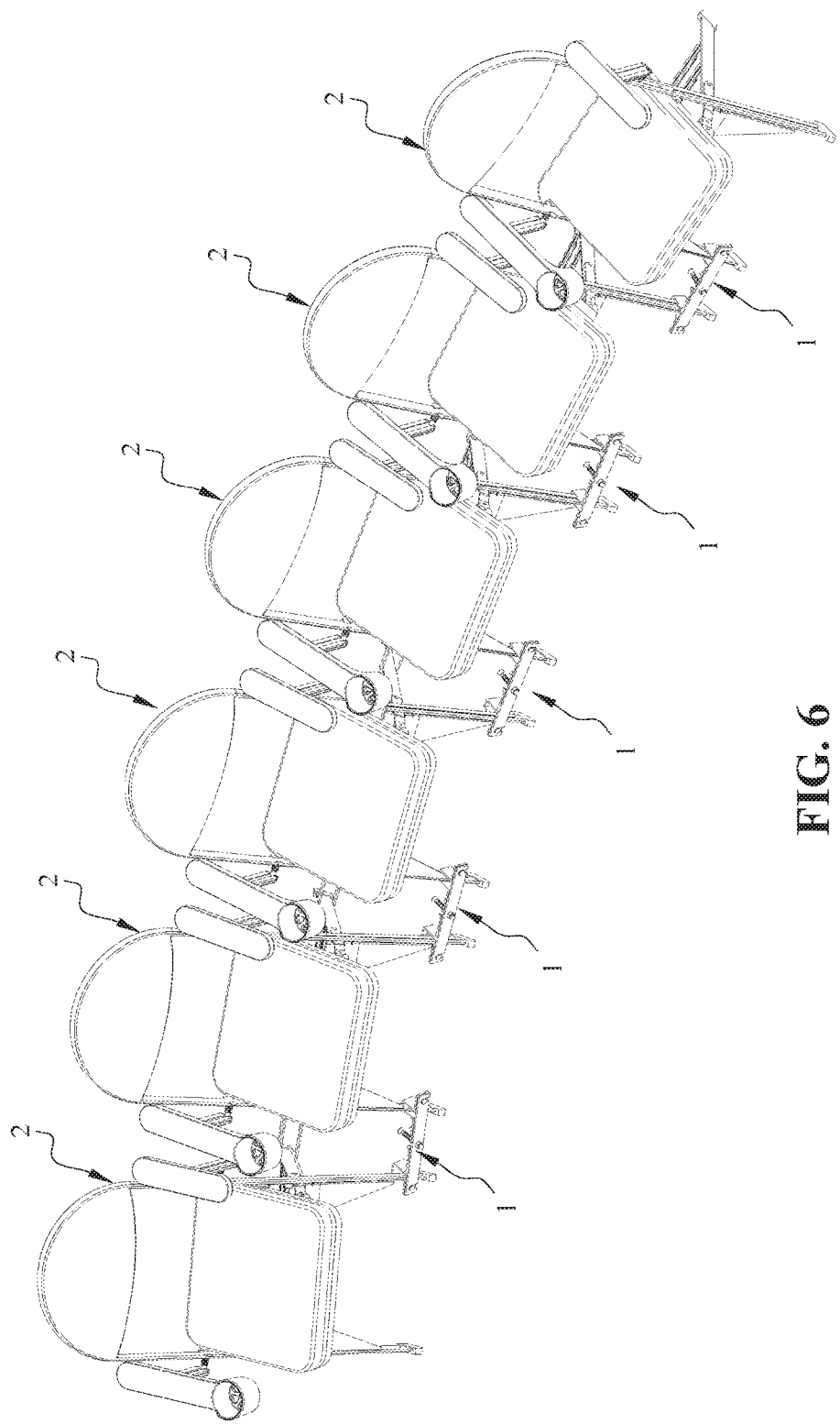
FIG. 6 shows the chair fixing device of the present invention, which fixes two front legs of an adjacent pair of chairs respectively such that a row of chairs extends in a curved line.

FIG. 6 shows the fixing device 1 of the present invention, which fixes two front and rear legs 21, 22 of an adjacent pair of chairs 2 respectively such that a row of chairs extends in a curved line. Note that a smaller size chair fixing device 1 of the present invention is implemented in order to connect the two front legs 21 of the adjacent pair of chairs 2 respectively while a larger chair fixing device 1 of the present invention is implemented in order to connect the two rear legs 22 of the adjacent pair of chairs 2 respectively such that the row of chairs 2 is arranged in the curved line.

Alternately and as described in the same manner, by reversing the smaller and larger fixing devices of the present invention, the row of chairs 2 can be arranged in a circle such that the backs of the chairs 2 face toward an axis of the circle (not visible).

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A fixing device for fixing two adjacent chairs, comprising:
an encircling element having left and right lateral sides and an intermediate portion that is located between said left and right lateral sides, that is formed with a notch and that is bent in such a manner as to form left and right limiting apartments at two sides of said notch, each limiting apartment having left and right walls extending integrally and transversely from a longitudinal axis of said encircling element and a middle wall interconnecting said left and right walls to define an opening accessible only from a direction that is the same direction, each of said left and right lateral sides being formed with a retainer stub extending transversely and outwardly from said longitudinal axis of said encircling element opposite to said limiting apartments;
a sluice gate having left and right notches disposed on said retainer stub of said encircling element for shielding and denying access into said limiting apartments and having defined therein a through hole in alignment with said notch of said encircling element; and
a locking member extending through said through hole in said sluice gate and said notch of said encircling element for preventing untimely disengagement of said sluice gate from said encircling element,
wherein each said retainer stub is formed with an enlarged head having a cross section greater than that of each of said left and right notches of said sluice gate such that said sluice gate is disposed stationarily on said encircling element via said enlarged head, respectively, and
wherein said locking member includes a threaded bolt extending through said notch of said encircling element and said through hole in said sluice gate, a first nut and a second nut mounted threadedly on said threaded bolt in such a manner as to sandwich said sluice gate and said encircling element tightly between said first nut and said second nut upon tightening of said threaded bolt.
2. The fixing device according to claim 1, wherein said threaded bolt has an enlarged head and a biasing spring sleeved around said threaded bolt and providing an axial compression force on said first nut.

* * * * *